United States Patent [19]

Sato

[11] Patent Number: 5,122,723
[45] Date of Patent: Jun. 16, 1992

[54] CHARGING CONTROL APPARATUS FOR VEHICLES

[75] Inventor: Hirohide Sato, Toyokawa, Japan

[73] Assignee: Nippondenso Co., Ltd., Kariya, Japan

[21] Appl. No.: 553,343

[22] Filed: Jul. 16, 1990

Related U.S. Application Data

[63] Continuation of Ser. No. 303,116, Jan. 30, 1989, abandoned.

[30] Foreign Application Priority Data

Feb. 1, 1988 [JP] Japan .................................. 63-22185

[51] Int. Cl.$^5$ .............................................. H02J 7/14
[52] U.S. Cl. ........................................ 320/64; 322/28; 322/33
[58] Field of Search ...................... 322/23, 24, 25, 28, 322/33; 320/64

[56] References Cited

U.S. PATENT DOCUMENTS

| | | | |
|---|---|---|---|
| 3,151,288 | 9/1964 | Avizienis et al. | 322/28 |
| 4,335,344 | 6/1982 | Gant | 320/64 X |
| 3,667,026 | 5/1972 | Bogut et al. | 320/36 |
| 3,857,082 | 12/1974 | Van Opijnen | 320/25 |
| 3,930,197 | 12/1975 | Saylor | 320/25 X |
| 4,308,492 | 12/1981 | Mori et al. | 322/23 X |
| 4,315,205 | 2/1982 | Mori et al. | 322/99 |
| 4,362,982 | 12/1982 | Akita et al. | 320/64 |
| 4,451,774 | 5/1989 | Akita et al. | 320/64 |
| 4,651,081 | 3/1987 | Nishimura et al. | 320/64 |
| 4,680,530 | 7/1987 | Mashino | 320/64 X |
| 4,791,349 | 12/1988 | Minks | 320/25 X |

FOREIGN PATENT DOCUMENTS

| | | |
|---|---|---|
| 58-154334 | 9/1983 | Japan . |
| 58-175938 | 10/1983 | Japan . |
| 61-58435 | 3/1985 | Japan . |
| 60-66698 | 4/1985 | Japan . |
| 62-131728 | 6/1987 | Japan . |

Primary Examiner—R. J. Hickey
Attorney, Agent, or Firm—Cushman, Darby & Cushman

[57] ABSTRACT

A charging control apparatus for a vehicle has a charging control unit. A voltage detecting terminal receives a control voltage that controls the output of a battery charging generator. This unit can use a Type I system, which directly detects the battery voltage and which maintains the battery voltage at its usual level of 14.5 volts by comparing the battery voltage with a threshold, or a Type II system which monitors the battery voltage using a microprocessor, and therefore the output signal indicative of battery voltage can never reach 14.5 volts. The Type II system maintains a normal voltage of 5 volts. The system operates to maintain the voltage between 5 volts and 14.5 volts so that the same system can operate with either Type I and Type II systems. Any voltages between these two limits causes the output of the generator to be increased.

9 Claims, 5 Drawing Sheets

CHARGING CONTROL APPARATUS FOR VEHICLES

This is a continuation of application Ser. No. 07/303,116, filed on Jan. 30, 1989, which was abandoned.

BACKGROUND OF THE INVENTION

This invention relates to a charging control apparatus for use in a vehicle wherein a control unit for controlling the state of electric generation by a generator has a decreased number of terminals for external connection.

Charging control systems for vehicles presently in use in this field are classified into a system type I shown in FIG. 2 and a system type II shown in FIG. 4. The system type I shown in FIG. 2 is intended to decrease its size and cost, while the system type II shown in FIG. 4 is intended to accurately control the voltage of a battery mounted on a vehicle.

More precisely, in the system type I shown in FIG. 2, a charging control unit 2, which controls a quantity of power generated by a generator 1 to charge a battery 3 mounted on a vehicle, has a terminal $T_1$ directly connected to the battery 3 for detecting the condition of the battery voltage. The charging control unit 2 is designed to control the battery voltage at the level of a first preset voltage of 14.5 V which is a normal control voltage level of a battery for a vehicle. Thus, when the level of the voltage detected at the terminal $T_1$ is equal to or higher than 14.5 V, the control unit 2 operates to decrease a quantity of power generated by the generator 1, while when the level of the voltage detected at the terminal $T_1$ is lower than 14.5 V, the control unit 2 operates to increase a quantity of electric power generated by the generator 1, so that the battery voltage can be maintained at the predetermined level of 14.5 V.

In the system type II shown in FIG. 4, output signals from various sensors, for example, a battery-electrolyte specific gravity sensor, a battery-electrolyte temperature sensor, a load sensor, etc. are applied to an external control unit (ECU) 6. After the ECU 6 has calculated a desired battery voltage level on the basis of the information output signals from the sensors, the ECU 6 applies an output signal through a terminal $T_2$ to a charging control unit 2, so that the voltage of a battery 3 can be controlled at the desired voltage level calculated by the ECU 6. However, in the case of the system type II, a source voltage of the ECU 6 itself is supplied by the battery 3. Therefore, the voltage of the terminal $T_2$, which functions to supply a voltage signal representing the condition of the battery voltage to the charging control unit 2, can not be set to the first preset voltage of 14.5 V, and it is inevitable that the voltage of the terminal $T_2$ is set to a second preset voltage equal to or lower than a minimum voltage of the battery 3 (for example, approximately 10 V).

However, if it is intended to use only one charging control unit 2 in common with both the system type I and system type II, it becomes necessary for the charging control unit 2 to have at least two input terminals $T_1$ and $T_2$ for receiving the voltage signal representing the condition of the battery voltage. That is, in a case where the charging control unit 2 is applied to the system type I, it is necessary to apply the battery voltage to one of the input terminals $T_1$ of the charging control unit 2 thereby to detect the battery voltage applied to the input terminal $T_1$. Thus, this input terminal $T_1$ is necessary for determining whether the detected battery voltage is equal to or higher than the first preset voltage of 14.5 V.

On the other hand, in a case where the same charging control unit 2 is applied to the system type II, because an output signal of several volts from the ECU 6 is used as an input signal to the charging control unit 2, the other input terminal $T_2$ of the charging control unit 2 is necessary for receiving the input signal and determining whether the input signal voltage is equal to or higher than the second preset voltage of several volts.

Thus, at least two input terminals $T_1$ and $T_2$ have been necessary for a single charging control unit 2 used in common with both the system type I and system type II, as described above.

Further, if the single charging control unit used in common with both the system type I and system type II has only one input terminal T, it becomes necessary to raise the voltage level of the output signal of the ECU 6 used in the system type II up to 14.5 V and hence to have a DC-DC converter for boosting purpose provided in the ECU 6, resulting in an undesirable increase in the size and cost of the ECU 6.

Further, if the single charging control unit 2 has a function of detecting disconnection of connection wires from both the input terminals $T_1$ and $T_2$ thereof, when the single charging control unit 2 is applied to either one of the system type I and system type II, there was an inconvenience such that an alarm signal indicating the disconnection of a connection wire from the input terminal to be used when the single charging control unit 2 is applied to the other one of the system type I and system type II.

SUMMARY OF THE INVENTION

With a view to obviating the above-mentioned inconvenience caused by the prior art apparatus, it is an object of the present invention to provide a charging control apparatus in which, by virtue of making a simple modification of the internal structure of the known charging control unit, the charging control unit thereof has only one input terminal for detecting the condition of the battery voltage.

In accordance with one aspect of the present invention, in order to attain the above-mentioned object, there is provided a charging control apparatus comprising a generator for a vehicle, a battery charged by an output of the generator, and a control unit controlling a quantity of electric power generated by the generator and having a detecting terminal for detecting the condition of a voltage of the battery, the control unit functioning to increase a quantity of electric generation by the generator when the voltage detected at the detecting terminal is at a level intermediate between a first preset voltage, which is equal to a normal level of the battery voltage, and a second preset voltage which is lower than a minimum voltage of the battery.

By virtue of the above-described construction of the charging control apparatus of the present invention, the quantity of electric power generated by the generator is increased when the voltage detected at the single detecting terminal is at a level intermediate between the first preset voltage and the second preset voltage. Therefore, regardless of whether the single detecting terminal for detecting the condition of the battery voltage is connected directly to the battery or connected to battery condition detecting means, the condition of the battery voltage can be detected by the single detecting terminal, whereby it is possible to control the quantity of electric power generated by the generator.

As described above, with the simple construction of the charging control apparatus of the present invention in which the first and second preset voltages are set, it is possible to use only one detecting terminal for detecting the condition of the battery voltage in any case where the detecting terminal is connected to the battery or the battery condition detecting means.

Figure 5:
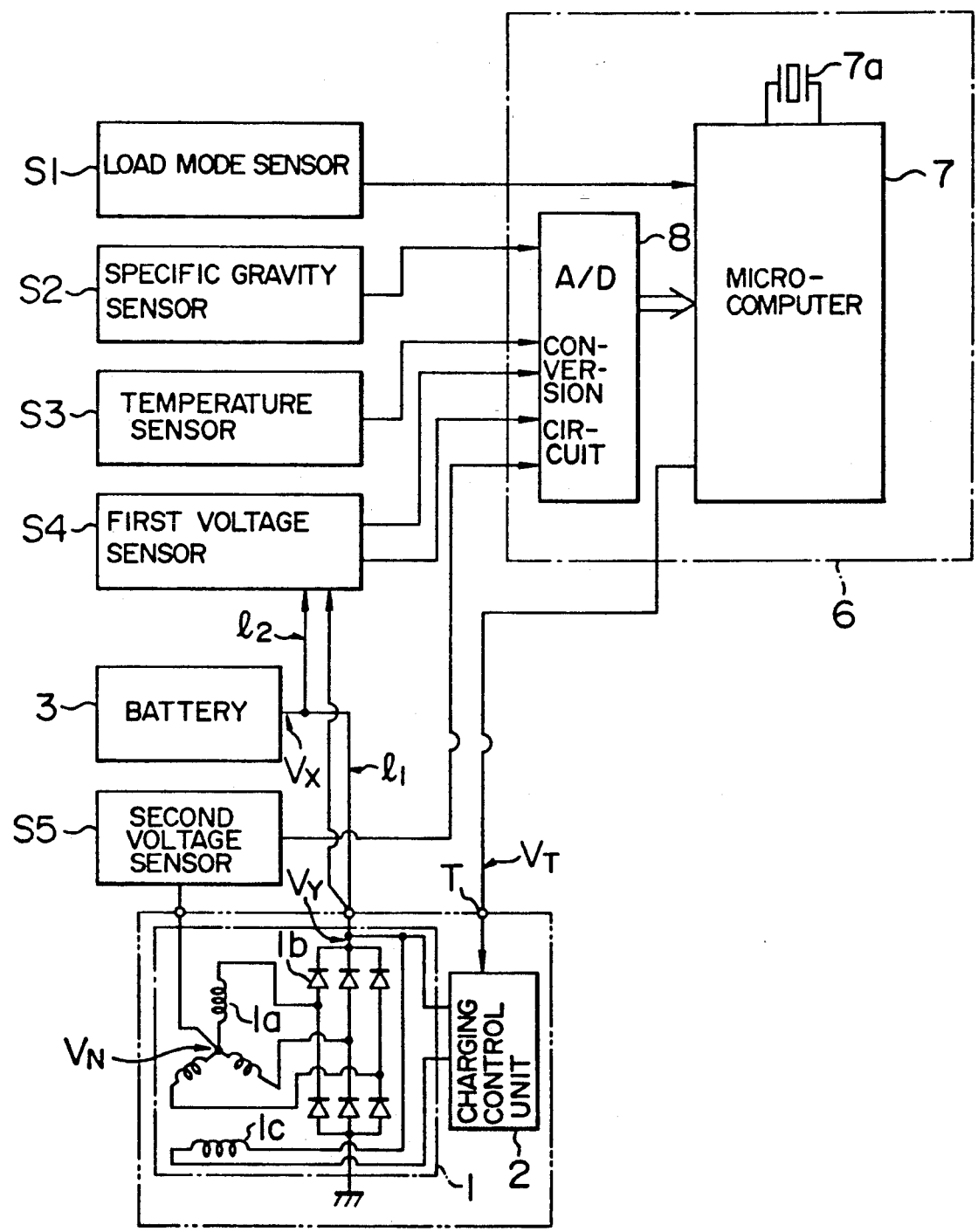
FIG. 5 is a circuit diagram showing the structure of an example of the charging control apparatus of the present invention when it is applied to the system type II.

Fi 7 is a circuit diagram showing an example of an output circuit of the microcomputer in the external control unit (ECU) 6 shown in FIG. 5.

Figure 8:
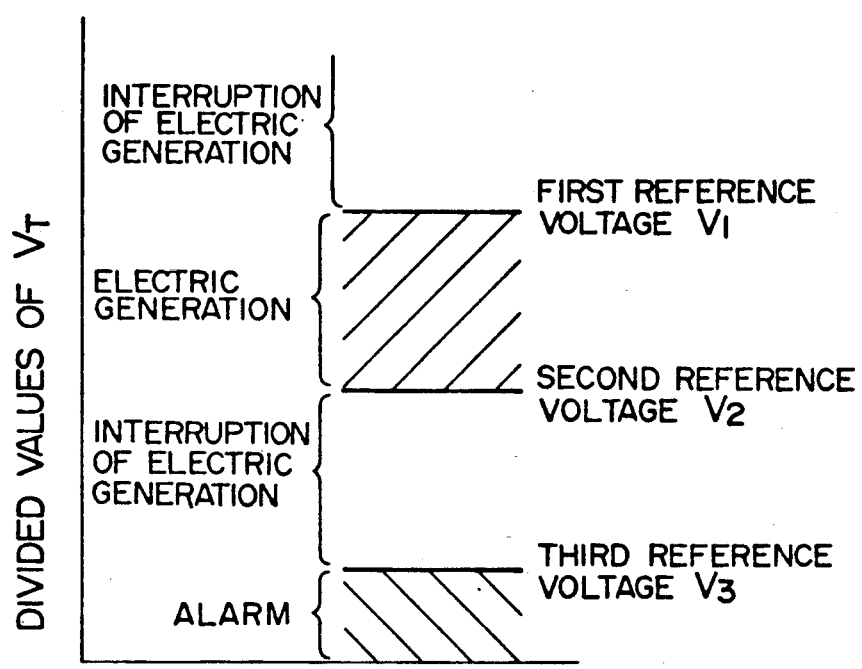

FIG. 8 shows schematically the correspondence of the relationship between the divided values of the voltage $V_T$ applied to the detecting terminal T and the three reference voltages $V_1$, $V_2$ and $V_3$, to the operating states of the generator.

Figure 9:
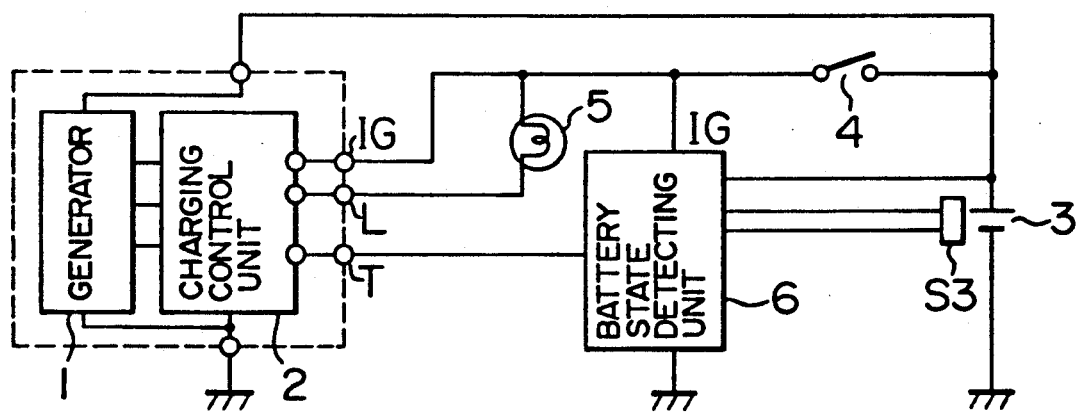

FIG. 9 is a circuit diagram showing the charging control apparatus of another embodiment of the present invention applied to the system type II of a simplified form in which a control voltage signal obtained only on the basis of the detected value of a temperature of the electrolyte of the battery is supplied from the battery state detecting unit to the detecting terminal T of the charging control unit of the charging control apparatus of the present invention.

DESCRIPTION OF THE PREFERRED EMBODIMENTS

Preferred embodiments of the present invention will now be described with reference to the accompanying drawings.

Figure 1:
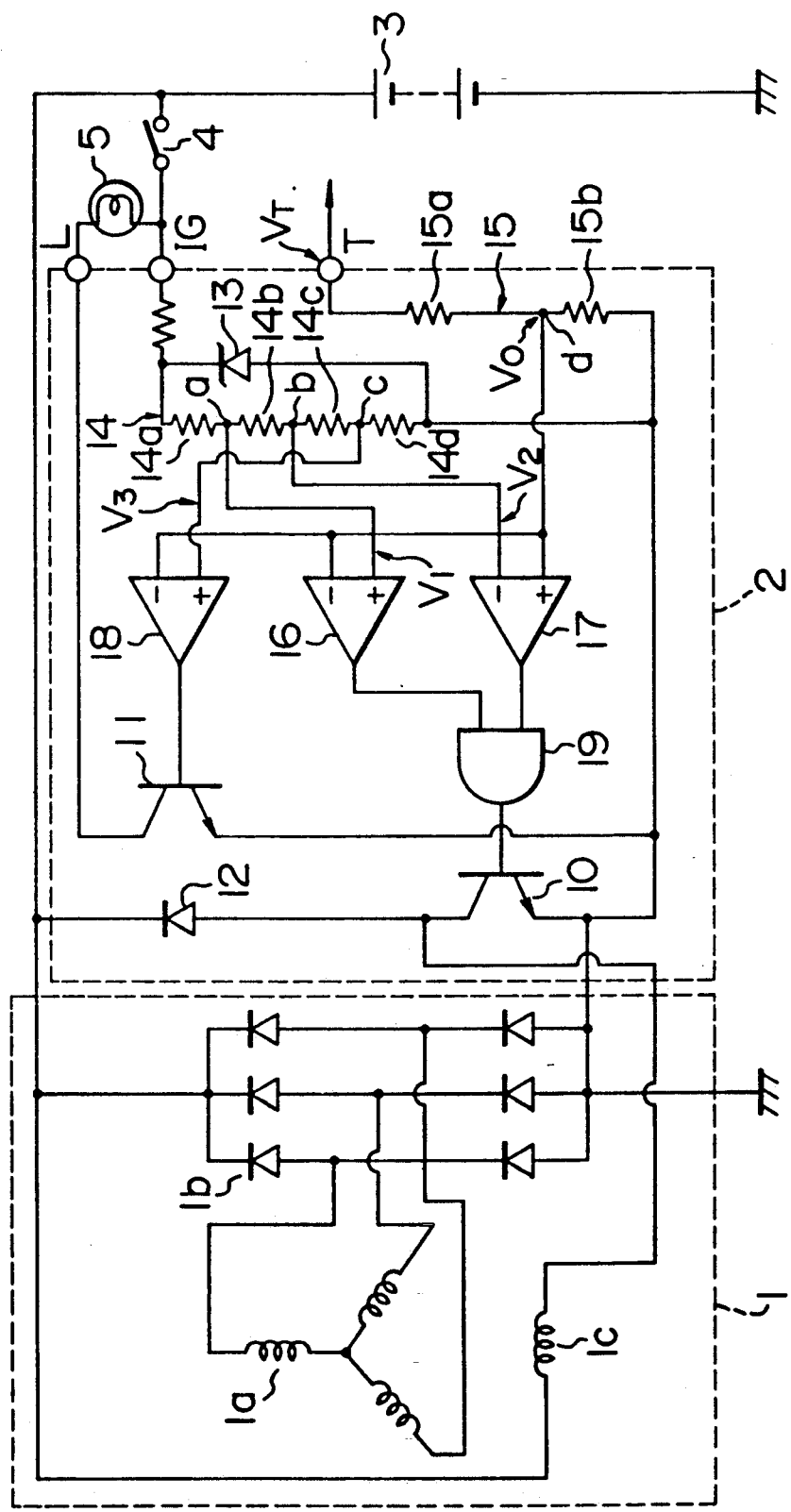
FIG. 1 is an electric circuit diagram showing the charging control apparatus for a vehicle of an embodiment of the present invention.

FIG. 1 shows a charging control apparatus for a vehicle of an embodiment of the present invention. Referring to FIG. 1, an AC generator 1 for a vehicle includes three-phase armature coils 1a, a group of rectifiers 1b and a field coil 1c. A charging control unit 2 is connected to the AC generator 1 and also to a battery 3 mounted on the vehicle through an ignition key switch 4. Numeral 5 designates an alarm lamp.

The charging control unit 2 includes a field current control transistor 10 for controlling a field current supplied to the field coil 1c of the generator 1 and an alarm lamp control transistor 11 for driving the alarm lamp 5. The charging control unit 2 has a terminal L for connection to the alarm lamp 5, a terminal IG for connection to the key switch 4, and a terminal T for detecting the state of the voltage of the battery 3.

A Zener diode 13 for generating a reference voltage is connected to the terminal IG, and a group of resistors 14, which includes a first resistor 14a, a second resistor 14b, a third resistor 14c and a fourth resistor 14d, is connected in parallel with the Zener diode 13. Another group of resistors 15 including a fifth resistor 15a and a sixth resistor 15b is connected to the terminal T.

A first comparator 16 has its non-inverting input terminal connected to the connection point a between the first resistor 14a and the second resistor 14b, so that a first reference voltage $V_1$ is applied to the non-inverting input terminal of the first comparator 16. The first comparator 16 has its inverting input terminal connected to the connection point d between the fifth resistor 15a and the sixth resistor 15b.

A second comparator 17 has its non-inverting input terminal connected to the above-mentioned connection point d and its inverting input terminal connected to the connection point b between the second resistor 14b and the third resistor 14c, so that a second reference voltage $V_2$ is applied to the inverting terminal of the second comparator 17. It is necessary that the second reference voltage $V_2$ is normally set to a level lower than a minimum level of the voltage of the battery 3.

A third comparator 18 has its non-inverting input terminal connected to the connection point c between the third resistor 14c and the fourth resistor 14d, so that a third reference voltage $V_3$ is applied to the non-inverting input terminal of the third comparator 18. The third comparator 18 has its inverting input terminal connected to the above-mentioned connection point d. The output terminal of the third comparator 18 is connected to the base of the alarm lamp control transistor 11.

An AND gate 19 has its two input terminals connected to the output terminals of the first and second comparators 16 and 17, respectively, and the output terminal of the AND gate 19 is connected to the base of the field current control transistor 10.

The operation of the charging control unit 2 having the above structure will now be described with reference to a case where the charging control unit 2 is applied to the system type I shown in FIG. 2. In this system type I, the detecting terminal T of the charging control unit 2 is directly connected to the battery 3, and a high voltage given by the division of the battery voltage is applied to the connection point d between the fifth resistor 15a and the sixth resistor 15b. Therefore, the second comparator 17 always generates a high level output signal, while the third comparator 18 always generates a low level output signal.

Figure 3:
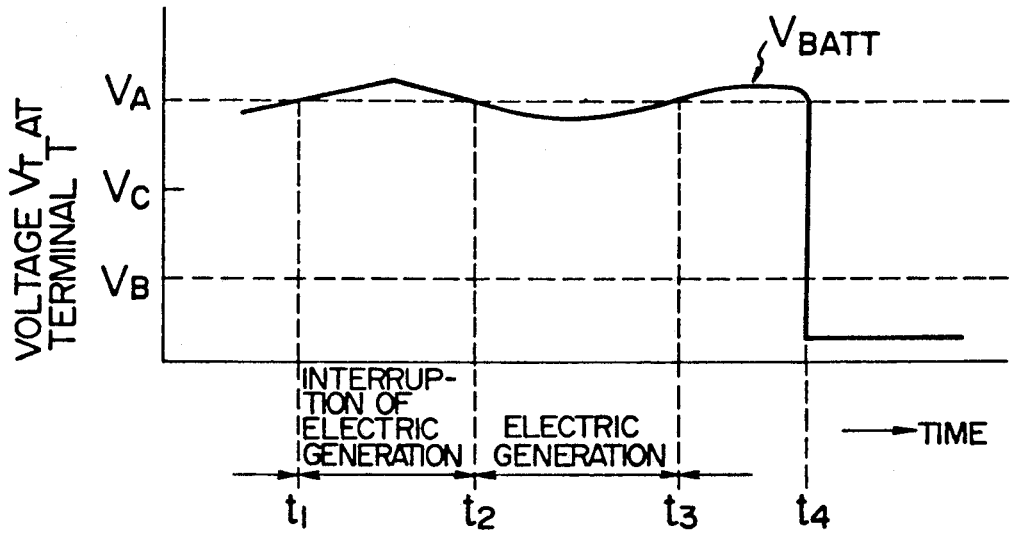
FIG. 3 is a graph showing a variation with time of the voltage at the detecting terminal T when the apparatus of the present invention is applied to the system type I.

The divided voltage $V_0$ at the connection point d and the first reference voltage $V_1$ are so selected that, when the voltage of the battery 3 is equal to or higher than the first preset voltage $V_A$ of 14.5 V, the first comparator 16 generates a low level output signal, while, when the voltage of the battery 3 is lower than 14.5 V, the first comparator 16 generates a high level output signal. FIG. 3 shows a variation with time of the voltage $V_T$ at the detecting terminal T. In response to the level of the output signal of the first comparator 16, the output signal of the AND gate 19 operates to turn off the field current control transistor 10 for a period from time $t_1$ to time $t_2$ and turn on the transistor 10 for a period from time $t_2$ to time $t_3$, as shown in FIG. 3. Thus, the voltage $V_{BATT}$ of the battery 3 can be controlled at the level of the first preset voltage $V_A$ of 14.5 V.

Next, the operation of the charging control unit 2 will be described with reference to a case where the charging control unit 2 is applied to the system type II shown in FIG. 4. In this system type II, the output of the external control unit (ECU) 6, that is, the battery state detecting unit 6 (composed of a microcomputer 7 and an A/D conversion circuit 8 as described later) is connected to the detecting terminal T of the charging control unit 2.

This battery state detecting unit 6 and various associated sensors S1 to S5 will be described with reference to FIG. 5. The sensor S1 is a load mode sensor which detects the state of an electric load and sets a corresponding load mode. In the example shown in FIG. 5, the load mode sensor S1 detects two typical states of electric loading, that is, the state of having driven short-distance head lamps and the state of having driven long-distance head lamps, as typical electric loads imposed after the start of engine operation. The sensor S2 is a battery-electrolyte specific gravity sensor for detecting the specific gravity of the electrolyte which is correlated with the quantity of charging of the battery 3 and generating an output signal representing the detected specific gravity of the electrolyte. This specific gravity sensor S1 is of a known float type or the like type, and is disposed in the electrolyte of the battery 3 to effect continuous or stepwise detection of the specific gravity in the range of approximately 1.18 to 1.30 in the case of an aqueous sulfuric acid solution, for example. The sensor S3 is a temperature sensor which detects the temperature of the electrolyte or electrode plates which is correlated with the charging characteristic of the battery 3 and generates a temperature signal. This temperature sensor S3 is composed of a temperature sensitive element such as a thermistor, a temperature sensitive transistor, etc. which is placed in the electrolyte of the battery or attached to the battery body.

The sensor S4 is a first voltage sensor which detects a charging voltage of the battery 3 or an electric generation voltage of the generator 1. This first voltage sensor S4 usually generates, as its first output, a battery charging voltage signal $V_X$ corresponding to a charged voltage of the battery 3. On the other hand, when there occurs breakage of a power supply wire $l_1$ or a voltage detection wire $l_2$, or disconnection of such wires from associated connecting terminals, the first voltage sensor S4 generates an output signal $V_Y$ representing an electric generation voltage of the generator 1 in place of the battery charging voltage signal $V_X$, thereby preventing an unlimited rise of the electric generation voltage of the generator 1. The sensor S5 is a second voltage which monitors whether the generator 1 is performing a normal electric generating operation. In the case shown in FIG. 5, the second voltage sensor S5 detects whether the voltage of the neutral point has reached a predetermined level and generates a neutral-point voltage signal $V_N$ upon detecting that the predetermined neutral-point voltage level is reached. Without being limited to the detection the voltage of the neutral point, the second voltage sensor S5 may detect a rotational speed of the engine or an output voltage generated by one of the three-phase armature coils $1a$.

As described above, the battery state detecting unit 6 shown in FIG. 5 is composed of a microcomputer 7 operating as an electronic processing means and an A/D conversion circuit 8. The microcomputer 7 is a microcomputer which inputs information signals supplied from the sensors S1 to S5 and executes digital processing in accordance with a predetermined control program. The microcomputer 7 becomes operative when it receives a clock signal from a quartz oscillator 7a of the oscillation frequency of several MHz and it is supplied with a stabilized voltage of 5 V from the battery 3 mounted on the vehicle through a voltage stabilizer circuit (not shown). Then, the microcomputer 7 operates to control the operation of the charging control unit 2 in response to the output signals from the sensors S1 to S5.

The A/D conversion circuit 8 sequentially converts respective analog signals supplied from the specific gravity sensor S2, temperature sensor S3, first voltage sensor S4 and second voltage sensor S5 into digital signals and supplies these digital signals to the microcomputer 7.

The microcomputer 7 executes a processing operation at a predetermined period. That is, the microcomputer 7 inputs respective output signals of the sensors S1 to S5 and executes a processing operation therein in accordance with the processing steps disclosed, for example, in JP-B-61-51497 (1986) (corresponding to U.S. Pat. No. 4,308,492) so as to decide whether the field coil $1c$ of the generator 1 should be excited in response to the charging condition of the battery 3.

An output signal voltage $V_{T1}$ from the microcomputer 7 to be supplied as the voltage $V_T$ when exciting the field coil $1c$ is decided depending on whether the divided voltage $V_{01}$ at the connection point d in the charging control unit 2 satisfies the condition of a second reference voltage $V_2 < V_{01} <$ a first reference voltage $V_1$. That is, because the voltage of the battery 3 is used as a power source voltage of the microcomputer 1, it is necessary to make the output voltage $V_T$ of the microcomputer 7 lower than the minimum voltage of the battery 3. Therefore, unless the second reference voltage $V_2$ is selected to be lower than the minimum voltage of the battery 3, the microcomputer 7 can not properly control the charging control unit 2.

On the other hand, an output signal voltage $V_{T2}$ from the microcomputer 7 when the field coil $1c$ is not excited, is decided depending on whether the divided voltage $V_{02}$ at the connection point d in the charging control unit 2 satisfies the condition of a third reference voltage $V_3 < V_{02} <$ the second reference voltage $V_2$.

Figure 6:
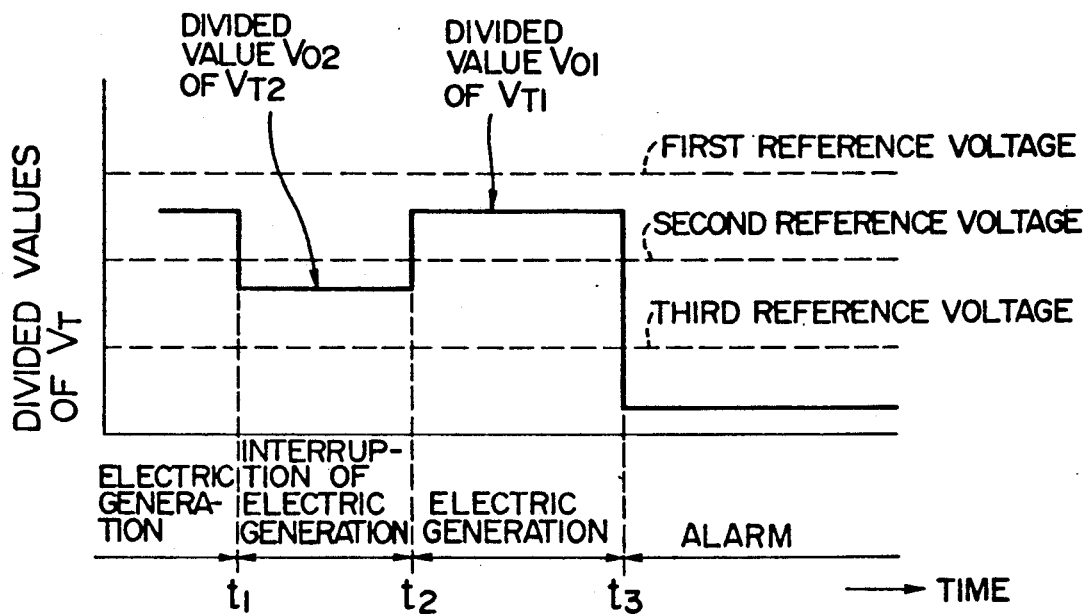
FIG. 6 is a graph showing a variation with time of the divided values of the voltages at the detecting terminal T when the apparatus of the present invention is applied to the system type II.

Therefore, an output signal of the microcomputer 7 is assumed to be $V_{T1}$, when it is decided to charge the battery 3 as a result of the computation on the input signals from the respective sensors made by the microcomputer 7. When the signal $V_{T1}$ is applied to the detecting terminal T of the charging control unit 2, both the first comparator 16 and the second comparator 17 generate respective output signals of a high level, and the AND gate 19 also generates an output signal of a high level, whereby the field current control transistor 10 is made conductive for a period from time $t_2$ to time $t_3$ as shown in FIG. 6. As a result, the battery 3 is charged by an output of the generator 1.

On the other hand, an output signal of the microcomputer 7 is assumed to be $V_{T2}$, when it is decided that the battery 3 is not to be charged as a result of the computation by the microcomputer 7. When the signal $V_{T2}$ is applied to the detecting terminal T of the charging control unit 2, the second comparator 17 generates an output signal of a low level, and the AND gate 19 also generates an output signal of a low level, whereby the field current control transistor 10 is made nonconductive for a period from time $t_1$ to time $t_2$ as shown in FIG.

6. As a result, the generator 1 is made to stop its electric generating operation. Thus, when the field coil 1c is to be excited, the microcomputer 7 is made to generate the voltage signal $V_{T1}$, while, when the field coil 1c is not to be excited, the microcomputer 7 is made to generate the voltage signal $V_{T2}$. These steps can be very easily programmed in the microcomputer 7, thus without incurring any increase in the cost.

When the connecting wire providing electrical connection between the detecting terminal T of the charging control unit 2 and the battery 3 is disconnected from an associated connecting terminal in the system type I, or when the connecting wire providing electrical connection between the detecting terminal T of the charging control unit 2 and the microcomputer 7 is disconnected from an associated connecting terminal in the system type II, the electric potential of the detecting terminal T of the charging control unit 2 becomes zero level. In such a case, the third comparator 18 generates an output signal of a high level to make the alarm lamp control transistor 11 conductive, thereby driving the alarm lamp 4. Then, the driver of the vehicle can be informed of the disconnection of the connecting wire from the detecting terminal T by the turning-on of the alarm lamp 5.

Further, when breakage of the connecting wire $l_1$ or $l_2$ shown in FIG. 5 occurs, the first voltage sensor S4 detects the connecting wire breakage and applies an output signal to the microcomputer 7 to inform the occurrence of the connecting wire breakage. In response to the application of the output signal from the sensor S4, the microcomputer 7 generates an output voltage signal $V_{T3}$ to inform the breakage of the connecting wires. The value of this output voltage signal $V_{T3}$ is preset so that the divided voltage $V_{03}$ thereof at the connection point d in the charging control unit 2 may become lower than the third reference voltage $V_3$, whereby the third comparator 18 can generate an output signal of a high level in the same way as the above-mentioned case.

Figure 7:
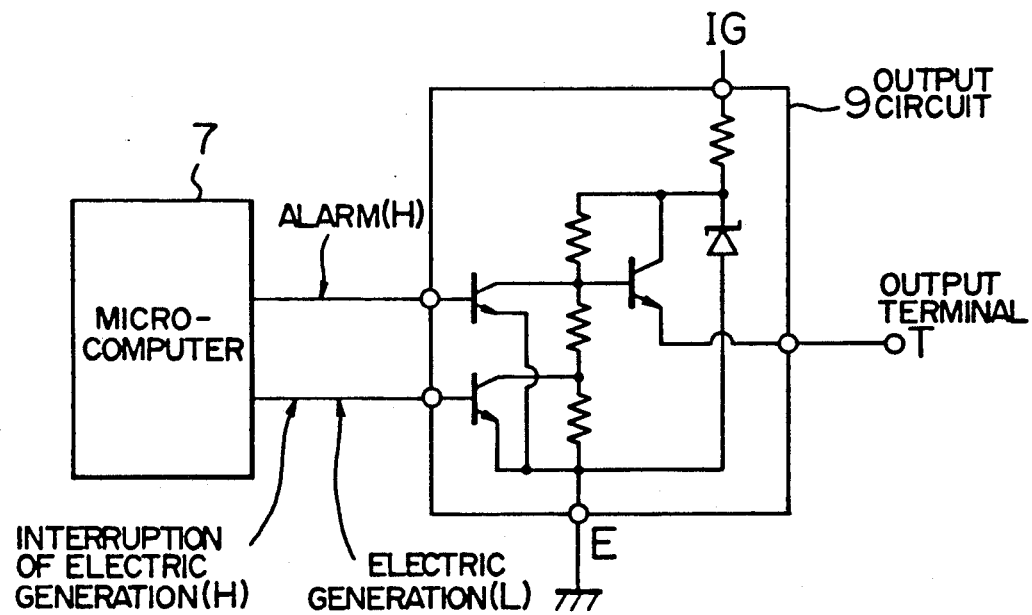

The microcomputer 7 is connected so as to apply its output signals to an output circuit 9 such as shown in FIG. 7, for example, so that the output circuit 9 outputs the previously described control voltage signals $V_{T1}$, $V_{T2}$ and $V_{T3}$ in accordance with the respective information representing electric generation, stoppage of electric generation, and generation of an alarm signal obtained by the processing operation performed in the microcomputer 7.

FIG. 8 shows the correspondence of the relationship between the divided values of the control voltages $V_T$ applied to the detecting terminal T and the three reference voltages $V_1$, $V_2$ and $V_3$, to the operating states of the generator. As seen from FIG. 8, in the apparatus of the present invention, in accordance with the divided voltages $V_0$ of the control voltages $V_T$ applied to the detecting terminal T, electric generation by the generator 1 is stopped when the divided voltage $V_0$ is higher than the first reference voltage $V_1$, the generator 1 performs electric generation when the divided voltage $V_0$ lies between the first reference voltage $V_1$ and the second reference voltage $V_2$, electric generation by the generator 1 is stopped again when the divided voltage $V_0$ lies between the second reference voltage $V_2$ and the third reference voltage $V_3$, and the alarm signal is generated when the divided voltage $V_0$ is lower than the third reference voltage $V_3$.

FIG. 9 is a circuit diagram showing another embodiment of the present invention which proposes a simplified form of the system type II. In the form shown in FIG. 9, a control voltage signal is supplied to the detecting terminal T of the charging control unit 2 from a battery state detecting unit 6', which control voltage is obtained solely on the basis of the detected value of the temperature of the electrolyte of the battery 3. That is, in the embodiment shown in FIG. 9, the battery-electrolyte temperature sensor S3 detects the temperature of the electrolyte of the battery 3, and the battery voltage is controlled in accordance with the detected temperature value of the electrolyte.

In this case, a temperature sensor, for example, of a semiconductor type is used as the battery-electrolyte temperature sensor S3. A desired voltage is preset with respect to the electrolyte temperature value detected by the semiconductor type temperature sensor. Then, the battery state detecting unit 6' applies an output control signal to the detecting terminal T of the charging control unit 2 so that the voltage of the battery 3 can be controlled at the desired voltage. The later steps of control are the same as those of the aforementioned other embodiments.

Figure 2:
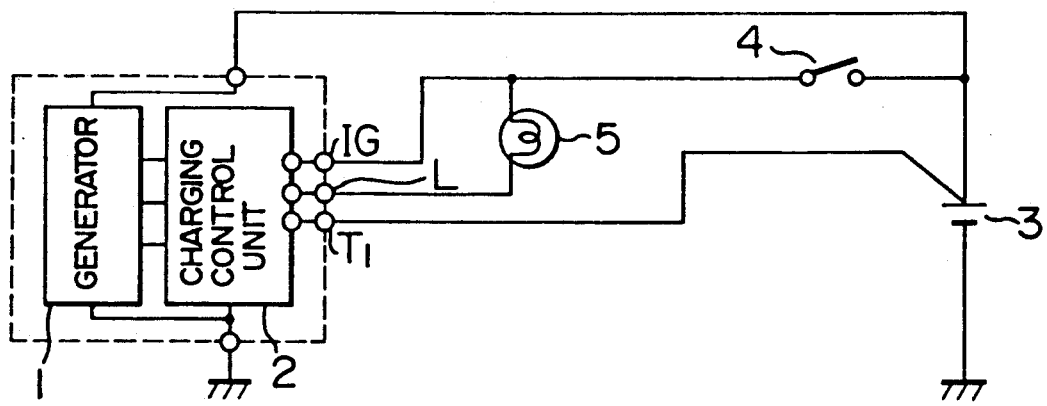
FIG. 2 is a circuit diagram showing the structure of the charging control apparatus of the present invention when applied to the system type I.
Figure 4:
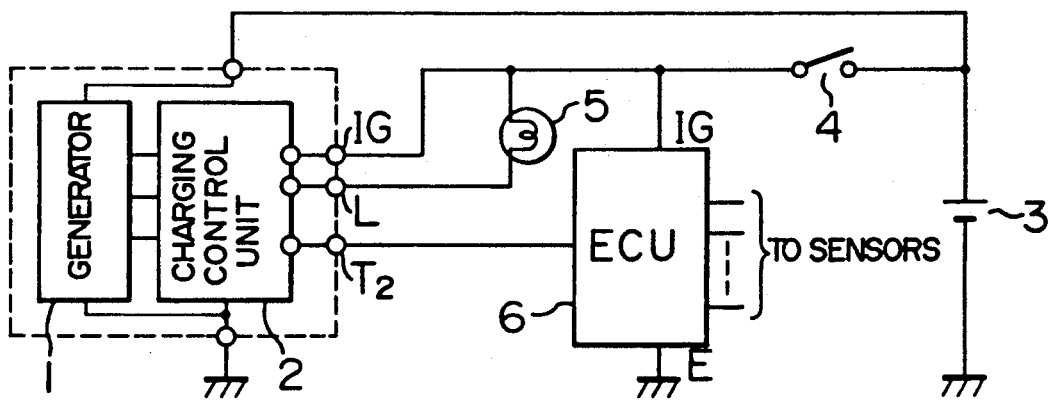
FIG. 4 is a circuit diagram showing the structure of the charging control apparatus of the present invention when it is applied to the system type II.

It will be understood from the foregoing detailed description that the charging control unit 2 having the structure shown in FIG. 1 can be used in common with both the system type I and system type II shown in FIG. 2 and FIGS. 4 and 9, respectively, without modifying the structure of the charging control unit 2 at all.

I claim:

1. A charging control apparatus for a vehicle comprising:

a generator for use in a vehicle;

a battery charged by an output of said generator; and a control unit controlling a quantity of electric generation by said generator and having a detecting terminal for receiving at least one signal having a level which is a function of a voltage of said battery, said control unit functioning to increase the quantity of electric generation by said generator when a voltage detected by said detecting terminal has a level intermediate between a first preset voltage which is selected to be equal to an expected full charge voltage of said battery and a second present voltage, which is selected to be lower than an expected minimum voltage of said battery for said vehicle to operate properly, but greater than zero volts, and not increasing said quantity when said voltage is higher than said first preset voltage, or lower than said second preset voltage but higher than a value greater than zero volts.

2. A charging control apparatus for a vehicle comprising:

a generator for use in a vehicle;

a battery charged by an output of said generator; and a control unit controlling a quantity of electric generation by said generator and having a detecting terminal for receiving at least one signal having a level which is a function of a voltage of said battery, said control unit functioning to increase the quantity of electric generation by said generator when a voltage detected by said detecting terminal has a level intermediate between a first preset voltage which is selected to be equal to an expected full charge voltage of said battery and a second preset voltage, which is selected to be lower than an expected minimum voltage of said battery for said vehicle to operate properly, and not increasing said quantity when said voltage is not intermediate, wherein said control unit generates an alarm signal when the voltage detected by said detecting terminal is equal to or lower than a third preset voltage which is lower than said second preset voltage.

3. A charging control apparatus for a vehicle comprising:
   a generator for use in the vehicle;
   a battery charged by an output of said generator;
   a control unit having a detecting terminal for receiving a signal having a level which is a function of a voltage of said battery, said control unit functioning to increase the output of said generator when a voltage detected by said detecting terminal has a level intermediate between a) a first preset voltage which is selected to indicate an expected full charge voltage of said battery and b) a second preset voltage which is selected to indicate a voltage lower than an expected minimum voltage of said battery for said vehicle to operate properly but greater than zero volts and not increasing said quantity when said voltage is higher than said first preset voltage, or lower than said second preset voltage but higher than a value greater than zero volts; and
   battery state detecting means, connected to monitor a condition of said battery, and having an output terminal connected to said detecting terminal and applying to said detecting terminal an output voltage corresponding to said condition of said battery, said battery state detecting means producing an output voltage which is lower than said first preset voltage and higher than said second preset voltage at all times when said condition of said battery is such to indicate the voltage of said battery is in a state which requires charging.

4. An apparatus as in claim 3 wherein said condition is a battery electrolyte temperature.

5. A charging control apparatus for a vehicle which operates using a battery, comprising:
   generator means adapted for supplying charge to said battery; and
   control means for controlling a quantity of electric generation by said generator means, and having a detecting terminal which is adapted to receive a signal having a level which is a function of a voltage of said battery,
   said control unit including means for increasing the quantity of electric generation by said generator means when a voltage detected by said detecting terminal has a level intermediate between a first preset voltage which is selected to be an expected full charge voltage of said battery, and a second preset voltage which is lower than an expected minimum voltage of said battery which minimum voltage is a voltage lower than a voltage which is needed for proper operation of said vehicle, and not increasing said quantity when said voltage is higher than said first preset voltage, or between said second preset voltage and a threshold greater than zero volts, and signalling an alarm when said voltage is less than said threshold.

6. A charging control apparatus for a vehicle which operates using a battery, comprising:
   battery state detecting means, connected to monitor a condition of said battery, and having an output terminal which produces an output voltage corresponding to said condition of said battery, said battery state detecting means being either a) a Type I system, which connects directly to said battery, and produces said output voltage equal to a battery voltage, or b) a Type II system, which includes a processor, and which produces a low level output voltage to indicate said battery is in a state that does not require charging, and produces a higher level output voltage, which is lower than a full charge voltage of said battery, to indicate said battery is in a state that requires charging;
   generator means adapted for supplying charge to said battery; and
   control means for controlling a quantity of electric generation by said generator means, and having a detecting terminal which is adapted to receive said output voltage from said battery state detecting means,
   said control means including means for increasing the quantity of electric generation by said generator means when a voltage detected by said detecting terminal has a level lower than a first preset voltage, which is selected to have a value equal to an expected normal voltage of said battery, and has a level higher than a second preset voltage, which is selected to have a value less than an expected minimum voltage of said battery which minimum voltage is a voltage lower than a voltage which is needed for said vehicle to operate properly, to thereby increase said battery voltage and to cause said output voltage to rise in said Type I system, and to cause said output level voltage to lower in said Type II system, and not increasing said quantity when said voltage is not intermediate between said values.

7. An apparatus as in claim 6, wherein said control means includes means for determining a fault when said voltage is less than a threshold which is greater than zero volts.

8. An apparatus for controlling charging in a vehicle which operates using a battery, comprising the steps of:
   battery state detecting means for monitoring a condition of said battery, and producing an output voltage corresponding to said condition of said battery, by using either one of a) a Type I system, which connects directly to said battery, and produces said output voltage equal to a battery voltage, or b) a Type II system, which includes a processor, and which produces a low level output to indicate said battery is in a state that does not require charging, and produces a high level output to indicate said battery is in a state that requires charging;
   generator means for supplying charge to said battery; and
   control means for controlling a quantity of electric generation by said generator means, by receiving said output voltage indicative of battery state from said battery state detection means, including:
   Type I means, operable with said Type I system, for increasing the quantity of electric generation by said generator means when a voltage detected by said detecting terminal has a level lower than a first preset voltage which is selected to have a value equal to an expected full charge voltage of said battery, to thereby increase said battery voltage and cause said voltage to rise, and not increasing the quantity of electric generation by said generator means when a voltage detected by said detecting terminal has a level higher than said first preset voltage; and Type II means, operable with said Type II system, for increasing the quantity of electric generation by said generator means when a voltage detected by said detecting terminal has a level higher than higher than a second preset voltage which is selected to have a value less than an expected minimum voltage of said battery which minimum voltage is a voltage lower than a voltage which is needed for said vehicle to operate properly, to thereby increase said battery voltage and cause said voltage to lower, and not increasing the quantity of electric generation by said generator means when a voltage detected by said detecting terminal has a level lower than said second preset voltage.

9. A method of controlling charging in a vehicle which operates using a battery, comprising the steps of:

monitoring a condition of said battery, and producing an output voltage corresponding to said condition of said battery, by using one of a) a Type I system, which connects directly to said battery, and produces said output voltage equal to a battery voltage, or b) a Type II system, which includes a processor, and which produces as said output voltage a low level output voltage to indicate said battery is in a state that does not require charging, and produces a high level output to indicate said battery is in a state that requires charging;

supplying charge to said battery; and controlling a quantity of electric generation by said supplying step, by receiving said output voltage indicative of battery state, by:

in a Type I system, increasing the quantity of electric generation when a voltage detected by said detecting terminal has a level lower than a first preset voltage which is selected to have a value equal to an expected full charge voltage of said battery, to thereby increase said battery voltage and cause said output voltage to rise, and not increasing the quantity of electric generation when a voltage detected by said detecting terminal has a level higher than said first preset voltage; and in a Type II system, increasing the quantity of electric generation when an output voltage detected by said detecting terminal has a level higher than higher than a second preset voltage which is selected to have a value less than an expected minimum voltage of said battery which minimum voltage is a voltage lower than a voltage which is needed for said vehicle to operate properly, to thereby increase said battery voltage and cause said output voltage to lower, and not increasing the quantity of electric generation when an output voltage detected by said detecting terminal has a level lower than said second preset voltage.

* * * * *